Patented June 8, 1937

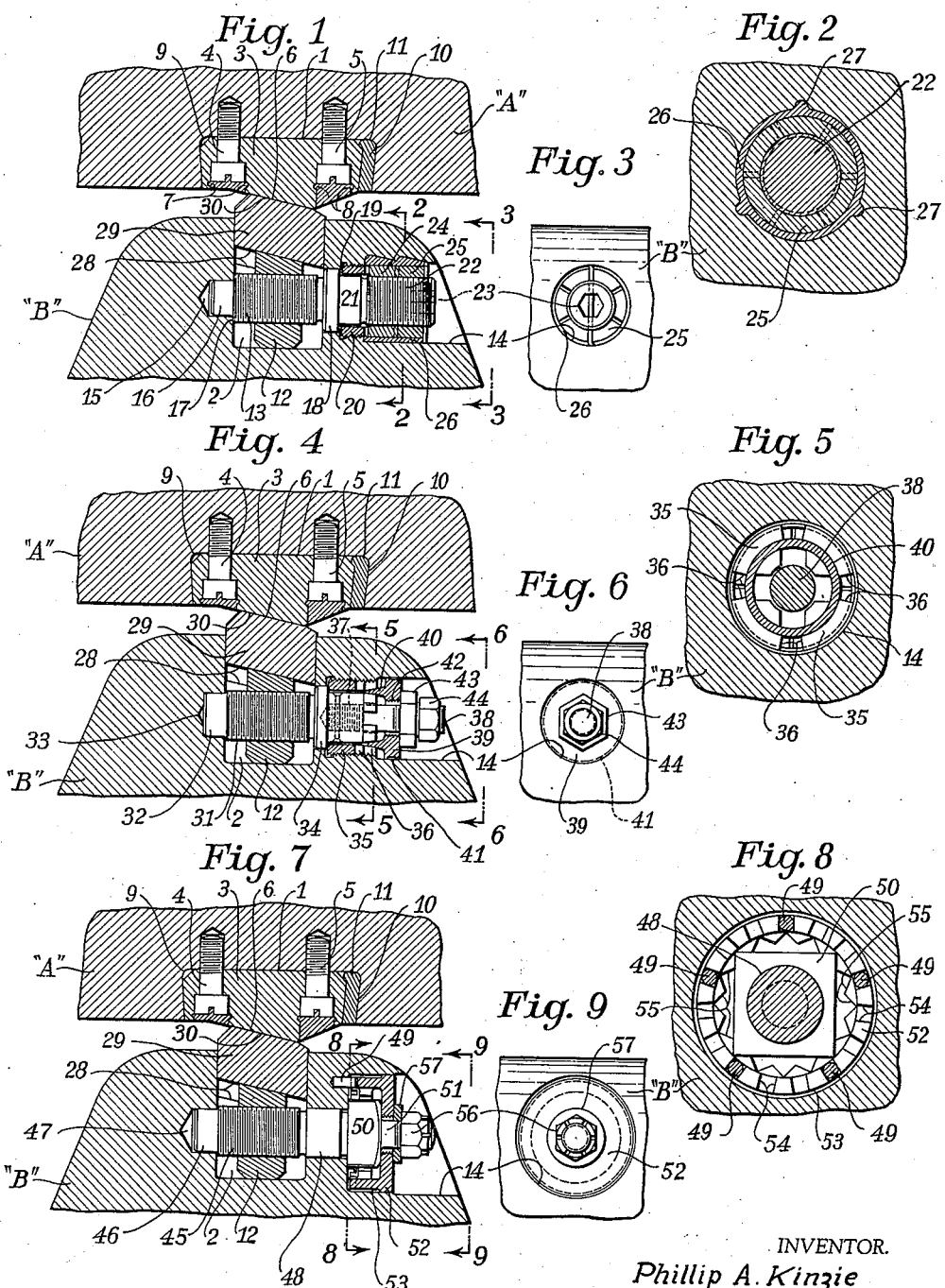

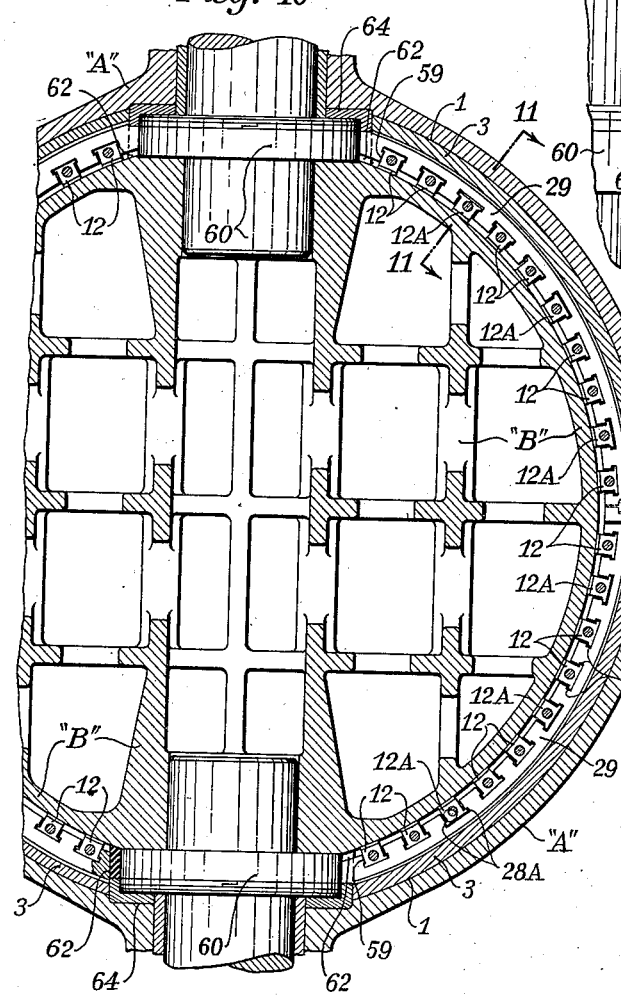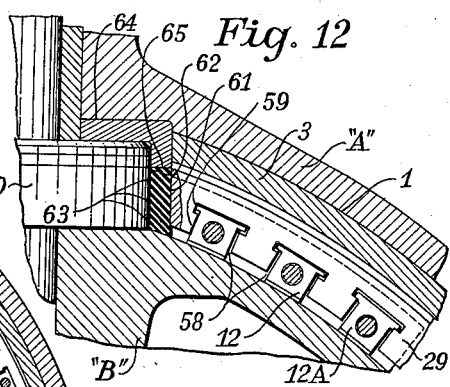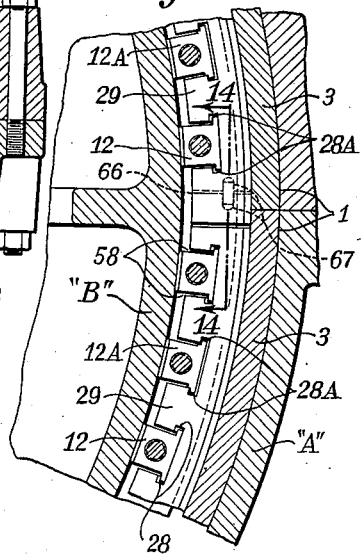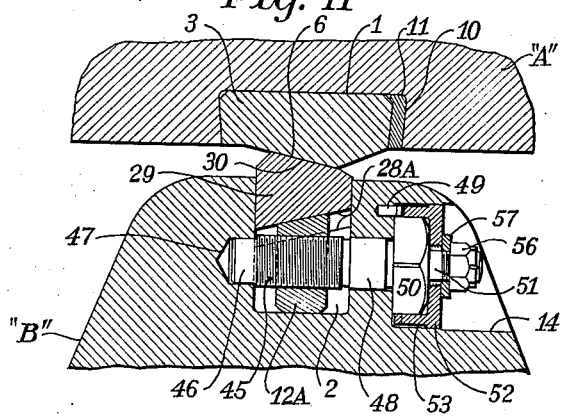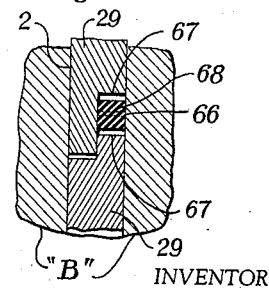

2,083,154

UNITED STATES PATENT OFFICE 2,083,154

VALVE SEALING DEVICE

Phillip A. Kinzie, John L. Savage, and Timothy S. Martin, Denver, Colo., assignors to Universal Hydraulic Corporation, Denver, Colo., a corporation of Colorado Application November 9, 1934, Serial No. 752,200

7 Claims. (Cl. 251—11)

This invention has reference to valve sealing devices for the type of valve disclosed in the P. A. Kinzie et al. United States Patent 1,951,283 issued March 13, 1934.

In valves of the character referred to it is essential that some sealing means of an adjustable character shall be provided whereby leakage past the closure member may be substantially prevented when the valve is closed, and it is to such means, of an adjustable character, that the present invention is directed.

The invention has as an object, a sealing means wherein the adjusting movement of the sealing element against its cooperating seating element, is by a wedge, the thrust of which is taken against other means than that which moves the wedge, while the thrust of the means moving the wedge is also distributed in such a manner as to render the movement of the wedge moving means relatively easy.

Further, the invention has as an object, the provision of a locking means for the wedge moving mechanism above referred to, such locking means being so arranged that an adjustment may be made to the finest degree for securing contact between the sealing and seating elements.

The invention has, as a still further object, the retention of the sealing element wherein the aforementioned wedges serve to rigidly retain and support the sealing element at the periphery of the butterfly leaf and restrain said sealing element against movement in any direction from an adjusted position.

Another feature is the means whereby segments of the sealing element are rendered fluid tight by the insertion of rubber or other resilient seals at the junctions of such segments.

The invention has for a particular object an adjusting means in which there is a differential relationship between two elements for the purpose of providing a lock against movement, thus rendering it possible to positively lock a screw means in substantially any adjusted position of the elements providing the adjustment.

With the foregoing in view there will now be described specific embodiments of the invention for the purpose of satisfying the patent statutes, and which have been illustrated in the accompanying drawings forming a part hereof; and wherein:

Fig. 1 is a transverse sectional view through a sealing means of the present invention;

Fig. 2 is a sectional view of the plane on the line 2—2 of Fig. 1;

Fig. 3 is an end view in the direction of the arrows on the line 3—3 of Fig. 1;

Fig. 4 is a view similar to Fig. 1 of a modified form of the invention;

Fig. 5 is a sectional view of the plane on the line 5—5 of Fig. 4;

Fig. 6 is an end view in the direction of the arrows on the line 6—6 of Fig. 4;

Fig. 7 is a view similar to view Figs. 1 and 4 of a further modified form of the invention;

Fig. 8 is a sectional view on the line 8—8 of Fig. 7 in the direction of the arrows on said line;

Fig. 9 is an end view in the direction of the arrows on the line 9—9 of Fig. 7;

Fig. 10 is a partial sectional view through a closed butterfly valve taken at right angles to the axial center line of flow;

Fig. 11 is a sectional view of the plane 11—11 of Fig. 10;

Fig. 12 is an enlarged fragmentary section at the top of Fig. 10;

Fig. 13 is an enlarged fragmentary section at the horizontal center line of Fig. 10; and Fig. 14 is a sectional view of the plane 14—14 of Fig. 13.

The invention as disclosed in Figures 1, 2, 3, and 4, is applied to the body and butterfly leaf of a valve of the type disclosed in the United States Patent to P. A. Kinzie et al., 1,951,283 issued March 13, 1934, in which "A" designates a part of the valve body and "B" the valve closure or butterfly element. The members "A" and "B" are of circular form and each is recessed as indicated at 1 and 2 for purposes to be hereinafter set forth.

The valve body "A", as stated above, is recessed at 1 and accommodates a seating element 3, which may be in the form of substantially semicircular or quarter sections secured in place by the machine screws 4 and 5 arranged in rows on either side of the central portion 6 of the seating element 3, and with heads countersunk in the manner indicated. Above the head of each of the screws 4 and 5 the material of the seating element 3 is undercut as shown at 7 and 8 so that Babbitt metal, or other material of a similar character, may be poured into these recesses and form a locking means preventing the screws 4 and 5 from backing out of their respective positions.

Also, the seating element 3 is relieved at one corner as shown at 9 and on the opposite side face, a space 10 is left between the body "A" and the seating element which is shaped at the bottom as indicated by 11 so that a caulking strip of metal may be used at this location to further insure tightness of the seating element 3 in its position; and it is to be noted that the metals selected for the respective parts should be of such character that there will be no destructive electrical action inherent in the combination of metals.

Within the recess 2 of the butterfly leaf member "B" are a series of wedges 12 fitting against the bottom of the recess 2 at their inner faces and having inclines as shown at their outer faces and each drilled and threaded to accommodate a screw element 13 which enters through a bore 14 directed at right angles to the recess 2, and which bores are spaced circumferentially on the butterfly leaf, and each of these receiving a screw 13 and its attendant mechanism for the adjustment, one of which will now be described.

Coaxial with the bore 14, and on the opposite side of the recess 2, is the recess 15 which receives the reduced end 16 of the screw 13 so that a bearing shoulder 17 is provided on the end of screw which rests against the adjacent face of the recess 2 and receives the axial end thrust in one direction from the adjusting screw while, at the other end of the threaded portion of the adjusting screw 13 is a collar 18 bearing against the washer 19 lying between it and the threaded retaining collar 20 screwed into the bore 14 and surrounding the unthreaded portion 21 of the adjusting screw 13 beyond which the adjusting screw 13 has a threaded portion 22 with a head recess 23 to receive a suitable wrench for moving the adjusting screw. The threaded portion 22 of the adjusting screw 13, beyond the retaining collar 20, receives the lock nuts 24 and 25 which may be of the castellated form, as shown, for receiving a suitable locking pin and around which there is a clearance space 26 with keying recesses 27 into which lead wool, or the like, may be packed in order to fill the space and prevent movement of the locking nuts 24 and 25.

Each of the wedges 12, as described, has its outer face inclined for engagement in the inclined slot 28 on the inside of a sealing element 29, the outer face 30 of which is of a corresponding inclination to the face or surface 6 of the seating element 3 so that the two may come into cooperating fluid tight engagement when the butterfly leaf of the valve is in a closed position and the sealing element has been properly adjusted.

Any suitable means known in the art may be employed for maintaining the general relationship in assembly of the sealing element 29 and the butterfly leaf "B", the present invention constituting primarily the means for accomplishing adjusting movement of the sealing element 29 in its recess 2 and for taking the thrust of such adjustment and of the closing pressure in the proper manner. However, as shown in Fig. 10, the wedges 12 are actually of T shape and enter a correspondingly shaped slot in the sealing element 29.

It will be observed from the foregoing that adjustments of the sealing element may be made at circumferentially spaced locations by removing the lead wool packing from the clearance space 26 and loosening the locking nuts 24 and 25, after which the adjusting screw 13 may be turned through the medium of a suitable wrench placed in the hexagonal recess 23, the adjustments being made on the various adjusting screws until, when the butterfly leaf "B" is in the closed position, there is complete contact between the surfaces 6 and 30 of the seating element 3 and sealing element 29. After completing the adjustment, several of the adjusting screws are turned in a reverse direction to that used for tightening the sealing element 29 and thereby cause the inner surfaces of the T-shaped wedges 12 to bear snugly against the inner face of the inclined slot 28, and thus rigidly secure the sealing element 29 against outward movement when the leaf "B" is in partial or full open positions. The lead wool packing is then again driven into the clearance spaces 26 and 27 to prevent turning of the lock nuts 24 and 25.

In connection with this type of adjusting mechanism it will be observed that axial thrust during adjustment and due to wedge action upon the screw 13, is taken up by the shoulder 17 and against the retaining collar 20, while actual pressure or inward thrust against the sealing element 29, due to contact with the seating element 3, is transmitted to the wedges 12 and thus carried back into the butterfly leaf "B" by the wedges 12 contacting the base of its recess 2, except at those points where the adjusting screws have been reversed at which points the axial thrust is taken through the collar 18 and washer 19 to the retaining collar 20, and the inward pull, due to the contact of the wedges 12 with the inner surface of the inclined slot 28, is taken into the threaded portion of the adjusting screw 12 and transmitted to the bearing surfaces of the reduced end 16 and collar 18.

It will be found that in the modifications described in connection with Figs. 4, 5, 6 and Figs. 7, 8, and 9, the seating element and its manner of attachment together with the sealing element and its wedges are identical with that just described in connection with Figs. 1, 2 and 3, consequently, there will be no additional description of these particular elements and the same reference characters will be used for these elements in connection with the description of the remaining figures.

In connection with the form of the invention shown in Figs. 4, 5, and 6, the bore 14 receives an adjusting screw having a threaded portion 31 entering the threaded recess in the wedge 12 in the same manner as described in connection with Fig. 1, but the end of the adjusting screw 31, as indicated at 32, is of substantially full size and extends into a recess 33 with its bottom wall faced off to correspond with the screw portion 32 so that there is provided a larger surface to take up end thrust axially of the screw 31 than is the case in connection with the form of the invention described and illustrated in Fig. 1. The end of the adjusting screw opposite the end 32 carries the enlarged portion 34 corresponding to the similar portion 18 of Fig. 1 and which engages with the threaded retaining collar 35, the threads of which are the reverse of those on screw 31, and functioning similarly to the retaining collar 20 of the form of the invention shown in Fig. 1 but which retaining collar is provided at its outer end with transverse sawcuts and milled slots 36, giving it a castellated effect as clearly shown in Fig. 5, the inside of the bore of this retaining collar being slightly bevelled at the outer end, and the end of the adjusting screw proper being also correspondingly bevelled at an opposite angle. The end of the adjusting screw is bored and threaded as at 37 to receive the threaded end of a stud 38; this end of the adjusting screw is also slotted to provide for a wrench to adjust or remove the adjusting screw, the milled slots or sawcuts 36 accommodating a spanner for removing the retaining collar 35. After the adjusting screw has been set to its proper position it is locked by a conical shaped locking member or wedge element 39 which has its conical annulus 40 engaging in the cooperatingly shaped annular recess formed by the bevelled adjacent surface of the retaining member 35 and the adjusting screw. This member 39 is cylindrical at its outer end to fit the wall of the bore 14 but is relieved, as is shown at 41, to avoid the possibility of serious cramping and sticking in the bore. The member 39 is interiorly, centrally or axially apertured and threaded, as shown at 42, and through which aperture the screw or stud 38 passes but does not engage, this threaded aperture 42 being provided to permit a matingly threaded sleeve to be screwed into the same for withdrawing the locking member 39.

When the adjusting mechanism is assembled in the manner shown in Fig. 4, a nut 43 screwed on to the stud 38 permits the locking member 39 to move inwardly as the nut 43 is screwed down and thus wedging the annulus 40 into the mating recess formed by the bevel on the retaining ring 35 and the adjusting screw, thereby establishing a tremendous frictional union between the retaining ring 35 and the adjusting screw, and at the same time wedging the castellations of the retaining ring 35 into cramped engagement with the threads in bore 14. Inasmuch as the torsional tendency of the adjusting screw to loosen is opposed to that of the retaining collar 35 due to their respective threads being opposite hand, the adjustment is locked in any position. A final locking nut 44 may be then screwed on the end of the stud 38 against the nut 43.

The sealing element 29 is locked rigidly within its retaining groove 2 in butterfly leaf "B" in substantially the same manner as has been described for the initial form of the invention.

With reference to the form of the invention illustrated in Figs. 7, 8, and 9, the adjusting screw has the intermediate threaded portion 45 with the end 46 entering the recess 47 and its opposite end provided with the unthreaded portion 48 which bears in the body of the butterfly "B" as shown. The bore 14 in this instance is concentric with the adjusting screw and has the circumferential spaced pins 49 at the outer portion for purposes to be hereinafter set forth. The end of the adjusting screw has the square head 50 carrying the threaded extension 51 and over this threaded extension and the square head 50 is a locking cap 52, relieved, as shown at 53, to prevent it from cramping, and the bottom surface of which has fifteen radial slots 54, while the inside periphery carries sixteen notches 55, from which it will be observed that this locking cap 52, by reason of the relationship between the number of notches 55 and the number of radial slots 54, may be placed in practically any adjusted position of the adjusting screw and yet will lock the same against torsional movement when the lock nut 56 is screwed upon the threaded extension 51 of the adjusting screw, a suitable lock washer or other device 57 being provided between the lock and cap 52 and the lock nut 56, or a Dardelet thread employed.

In this form of the invention the absence of a retaining collar makes it necessary to reverse the inclined slot as at 28A and also the wedge as at 12A, which are shown on Fig. 11, for locking the sealing element rigidly within the groove 2 in the butterfly leaf "B".

Figs. 10, 12, 13, and 14 illustrate the fitting of the T shaped wedges 12, and show the location of the reversed wedges 12A as well as also illustrating the method for securing a fluid tight sealing element 29 at the juncture with the stems 60 and at the segmental joints.

It will be noted that a clearance 58 is allowed between the wedges 12 and 12A and the sealing element 29 along the circumferential center line, except at the wedge face 59 adjacent to the stems 60; this is done so that the wedge 12 adjacent to the stem will act as a pivot, and as the sealing element 29 is tightened the radially outward motion, with its attendant increase in the circumference, will allow the seal to move circumferentially between the clearance 58 and the wedges 12.

Adjacent to the stems 60 the sealing element 29 has a slot 61 in which a rubber block 62 of slightly greater depth than that of the slot is placed. When the wedge 12, adjacent to the stem is assembled, a slight compression of the rubber occurs causing it to bear tightly against the stem at 63 and on the surface of the bushing 64 at 65, thereby providing a fluid tight seal at this juncture.

Fluid tight contact is maintained at the joint of two sealing segments 29 by step cutting the two segments in a manner common to piston rings. In order to close the gap 66 thus caused half oval shaped recesses 67 are cut on the upstream face of the mating seating elements 29, into the oval shaped recess thus formed, a block of rubber 68 of slightly greater depth than that of the slot is inserted so that when the sealing elements 29 are inserted in the groove 2 in the butterfly leaf a fluid tight contact is maintained with the leaf and the gap 66 is thus rendered completely fluid tight.

While, in the foregoing, we have described specific embodiments of the invention, it is nevertheless to be understood that in practicing the same we may resort to any and all modifications falling within the scope of the appended claims defining the invention.

What is claimed is—

1. A valve sealing device comprising, in combination with valve body and closure members, a seating element on the one member having an inclined face, and the other member being recessed, a sealing element movable in said recess and having an inclined face for surface engagement with the inclined face of the aforesaid seating element, a T shape inclined groove in said sealing element, a wedge nut shaped to slide in said groove and lying within said recess for moving the sealing element, and screw means engaging the wedge for moving the same to adjust the aforesaid sealing element.

2. A valve sealing device comprising, in combination with valve body and closure members, a seating element on the one member having an inclined face, and the other member being recessed, a sealing element movable in said recess and having an inclined face for surface engagement with the inclined face of the aforesaid seating element, wedge means within said recess and engaged with said sealing element for moving the latter in and out with respect to the recess, screw means engaging the wedge for moving the same to adjust the aforesaid sealing element, and screw locking means including interengaging locking nuts, and removable locking means surrounding said locking nuts.

3. A valve sealing device comprising, in combination with valve body and closure members, a seat element on the one member and the other member being recessed, a sealing element movable in said recess and faced for surface engagement with the face of the aforesaid seat element, wedge means within said recess and engaged with said sealing element for moving the latter in and out with respect to said recess, screw means engaging the wedge for moving the same to adjust the aforesaid sealing element, a threaded member on the outer end of said screw means and provided with flexible thread engaging castellations, and means for wedging said castellations against the thread to lock the screw adjustment.

4. A valve sealing device comprising, in combination with valve body and closure members, a faced seat element on the one member and the other member being recessed, a sealing element movable in said recess and faced for surface engagement with the face of the aforesaid seat element, wedge means within said recess for moving the latter in and out with respect to said recess, screw means engaging the wedge means for moving the same to adjust the aforesaid sealing element, a counter threaded member on the outer end of said screw means, and means for wedging the counter threaded member into frictional union with the screw means.

5. A valve sealing device comprising, in combination with valve body and closure members, a seat element on the one member, and the other member being recessed, a sealing element movable in said recess and faced for surface engagement with the face of the aforesaid seat element, wedge means within said recess and engaged with said sealing element for moving the latter in and out of the recess, screw means for engaging the wedge means for moving the same to adjust the aforesaid sealing element, said screw means having a poly-sided head, pins in the said other member radially spaced from and surrounding said head, and a locking element having slots for receiving said pins and notches for receiving the corners of said head, the number of said pin slots and the number of notches for receiving the corners of said head being different.

6. A valve sealing device comprising, in combination with valve body and closure members, a seating element on the one member, and the other member being recessed, a sealing element movable in said recess and faced for surface engagement with the face of the aforesaid seating element, wedge means within said recess and engaged with said sealing element for moving the latter in and out of the recess, screw means engaging the wedge means for moving the same to adjust the aforesaid sealing element, said screw means having a poly-sided head, pins in the said other member radially spaced from and surrounding said head, and a locking element having slots receiving said pins and notches receiving the corners of said head, the number of said pin slots being odd and the number of notches receiving the corners of said head being even.

7. A valve sealing device comprising, in combination with body and closure members, a faced seat element on the one member and the other member being recessed, a sealing element movable in said recess and faced for surface engagement with the face of the aforesaid seat element, wedge means within said recess for moving the latter in and out with respect to said recess, screw means engaging the wedge means for moving the same to adjust the aforesaid sealing element and for moving the wedge means to support the sealing element in adjusted position, a counterthreaded member on the outer end of said screw means, and means for wedging the counterthreaded member into frictional union with the screw means.

PHILLIP A. KINZIE.
JOHN L. SAVAGE.
TIMOTHY S. MARTIN.